(12) United States Patent
Dohnal et al.

(10) Patent No.: US 7,449,851 B2
(45) Date of Patent: Nov. 11, 2008

(54) ARRANGEMENT FOR AUTOMATICALLY INFLUENCING A MAINS SUPPLY AND MOTOR DRIVE THEREFOR

(75) Inventors: Dieter Dohnal, Lappersdorf (DE); Jochen Ermisch, Radebeul (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 1199 days.

(21) Appl. No.: 10/451,806

(22) PCT Filed: Mar. 26, 2002

(86) PCT No.: PCT/EP02/03358

§ 371 (c)(1),
(2), (4) Date: Jun. 25, 2003

(87) PCT Pub. No.: WO02/086647

PCT Pub. Date: Oct. 31, 2002

(65) Prior Publication Data

US 2004/0070359 A1 Apr. 15, 2004

(30) Foreign Application Priority Data

Apr. 20, 2001 (DE) .............................. 101 19 664

(51) Int. Cl.
 *H02P 1/00* (2006.01)
 *H02P 3/00* (2006.01)
 *H02P 5/00* (2006.01)
 *H02P 7/00* (2006.01)
(52) U.S. Cl. ........................................ 318/280
(58) Field of Classification Search .................. 318/280
 See application file for complete search history.

(56) References Cited

U.S. PATENT DOCUMENTS

| | | | | |
|---|---|---|---|---|
| 4,419,619 | A | 12/1983 | Jindrick | 323/257 |
| 5,604,423 | A | 2/1997 | Degeneff | 323/258 |
| 5,736,827 | A * | 4/1998 | Dohnal et al. | 318/696 |
| 5,969,511 | A | 10/1999 | Asselman et al. | |
| 6,184,639 | B1 | 2/2006 | Wallner | |

FOREIGN PATENT DOCUMENTS

| | | |
|---|---|---|
| DE | 2410641 | 9/1975 |
| DE | 42 14 431 A1 | 11/1993 |
| DE | 42 36 378 C1 | 6/1994 |
| DE | 197 14 868 A1 | 10/1998 |
| DE | 198 15 964 A1 | 10/1999 |
| WO | 94/24662 | 10/1994 |
| WO | 97/05536 | 2/1997 |

* cited by examiner

*Primary Examiner*—Lincoln Donovan
*Assistant Examiner*—Erick Glass
(74) *Attorney, Agent, or Firm*—Andrew Wilford (57) ABSTRACT

The invention relates to an arrangement for automatically influencing a mains supply. A voltage transformer is provided as a pilot transformer which detects the real value of the voltage which is to be adjusted and which transmits said value to a motor drive via an individual electric measuring circuit in which means are provided for comparing said real value to a set point value and for producing an adjustment command which is dependent upon said comparison. The invention also relates to a correspondingly equipped motor drive provided with an additional control module which directly actuates an electric motor independently from the direction of rotation when required. Said electric motor drives a step-switching mechanism on the variable-voltage transformer, whereby the voltage is adjusted, thereby influencing the mains supply.

8 Claims, 7 Drawing Sheets

Prior Art

ARRANGEMENT FOR AUTOMATICALLY INFLUENCING A MAINS SUPPLY AND MOTOR DRIVE THEREFOR

CROSS REFERENCE TO RELATED APPLICATIONS

This application is the U.S. national phase of PCT application PCT/EP02/03358, filed Mar. 26, 2002, published Oct. 31, 2002 as WO 2002/086647, and claiming the priority of German patent application 10119664.4 itself filed Apr. 20, 2001, whose entire disclosures are herewith incorporated by reference.

FIELD OF THE INVENTION

The invention relates to an arrangement for the automatic influencing of electrical energy supply mains or distribution mains, termed mains influencing in the following, with a tapped transformer equipped with different winding taps. The invention further relates to a motor drive for automatic mains influencing with such a tapped transformer.

Variable power transformers, which are constructed as tapped transformers and have a control winding with different winding taps able to be connected without interruption by a tap changer having a motor drive mechanically connected therewith, usually serve for automatic influencing of mains. A change in the translation ratio of the tapped transformer and thus a voltage regulation are achieved by selectable connection of different winding taps of the control winding.

A known arrangement for mains influencing by voltage regulation usually consists of several components. At the outset, there is provided a measurement transducer, preferably an inductive measurement transformer, at the tapped transformer, by which the respective voltage to be regulated is detected as an actual value. In addition, a voltage regulator is provided that is arranged remotely from the tapped transformer in a control room or the like. There is communicated to this voltage regulator by way of electrical signal lines from the measurement transducer the electrical output signal thereof as information with respect to the measured voltage as an actual value. This actual value of the voltage is then compared in the voltage regulator with a previously set target value of the voltage that is to be kept just as constant as possible by means of the tap transformer, and if required a switching command 'higher' or 'lower' is generated taking into account further previously set control parameters, such as, for example, the delay time. This switching command is in turn communicated by way of electrical connecting lines to the motor drive of the tapped transformer. The motor drive produces a rotational movement of its drive shaft depending on the direction 'higher' or 'lower' of the communicated switching command; this rotational movement is transmitted by way of the drive linkage to the tap changer that then undertakes in dependence on rotational direction a switching over from the currently connected winding tap to the next higher or next lower winding tap. The tap changer itself is usually sunk into the tank of the tapped transformer or also fastened to the outer side thereof, just like the associated motor drive.

Specific data, such as, for example, the actual setting of the tap changer, are communicated back to the voltage regulator by way of further electrical connecting lines. Such a known arrangement for voltage regulation is known from DE-OS 24 10 641. It is disadvantageous with this arrangement that the motor drive has a plurality of electrical outputs which all have to be connected with the corresponding voltage regulator by means of separate electrical lines. These line connections result from the fact that numerous items of information, for example with respect to the actual setting of the tap changer, rotation and rotational direction of the drive shaft, etc., are produced in the motor drive by electrical or electromechanical means, but are processed only in the voltage regulator that is often physically far removed. Further lines are required in order, as explained, to conduct the setting commands that are delivered by the voltage regulator to the motor drive. Finally, the measurement transducer and the voltage regulator also have to be connected together by electrical lines.

A so-termed autotransformer is known from GB-PS 21 09 960 (U.S. Pat. No. 4,419,619), in which the voltage regulator is arranged directly at the transformer, but here too, the disadvantage still remains of a plurality of electrical connecting lines between voltage regulator and motor drive.

Finally, a corresponding arrangement is known from DE 42 14 431 A1 (U.S. Pat. No. 5,736,82) in which the voltage regulator and motor drive are interconnected instead of by numerous individual lines only by a single serial bidirectional data line. However, such as data line, which is preferably an optical conductor, also represents a substantial disadvantage between two subassemblies physically separated from one another, especially since further connections between the measurement transducer and the voltage regulator are also obligatory here, even if this is not specifically mentioned in the stated prior publication.

OBJECT OF THE INVENTION

It is the object of the invention to provide an arrangement for automatic mains influencing that avoids the disadvantages of the state of the art, namely an extensive electrical or other wiring between separately arranged subassemblies. In addition, the object of the invention is to indicate a motor drive suitable for such an arrangement.

SUMMARY OF THE INVENTION

According to the invention the objects is attained by an arrangement wherein the motor drive also comprises means for comparison of the measured actual value with the previously established target value and for generation of the setting command dependent on the comparison and a single electrical measurement line leads directly from the measurement transducer to the motor drive. The invention is also a motor drive wherein a control subassembly is provided in the common housing and is connected by an interface subassembly with a measurement line of a measurement transducer mounted outside the housing, and the control subassembly comprises means for comparing measurement signal generated by the measurement transducer and arriving on the measurement line with a previously stored target value and for generating a regulating signal in dependence on the comparison and the electric motor is directly actuatable by the control subassembly in dependence on rotational direction.

Of particular advantage with the arrangement according to the invention is the compact construction thereof. According to the invention the arrangement consists of a device for producing a voltage actual value, preferably a voltage transducer and here again particularly advantageously a non-conventional voltage transducer, directly at the transformer, and an electronic motor drive that additionally also comprises the electrical and electronic means for voltage regulation for the mains influencing and that is similarly directly arranged at the transformer and in turn directly mechanically connected—by means of the usual drive shaft with the tap changer in or at the transformer. All subassemblies are thus mounted directly on the transformer; wiring to and from a physically distant control room, at which a separate voltage regulator is arranged according to the state of the art as independent apparatus or 19 inch plug-in module, is thus redundant. There is merely then still required a single electrical connection from the device at the transformer, for example the non-conventional voltage transducer that supplies the measurement signal as voltage actual value to the electronic motor drive. The electrical connections that act bidirectionally between motor drive and a physically separate voltage regulator according to the state of the art are completely redundant, since, as explained, in accordance with the invention the electronic motor drive entirely takes over the function of the former voltage regulator and this element is thus not required as a separate subassembly.

BRIEF DESCRIPTION OF THE DRAWING

The inventions will be explained in still more detail in the following by way of example by reference to drawings, in which.

SPECIFIC DESCRIPTION

Figure 1:
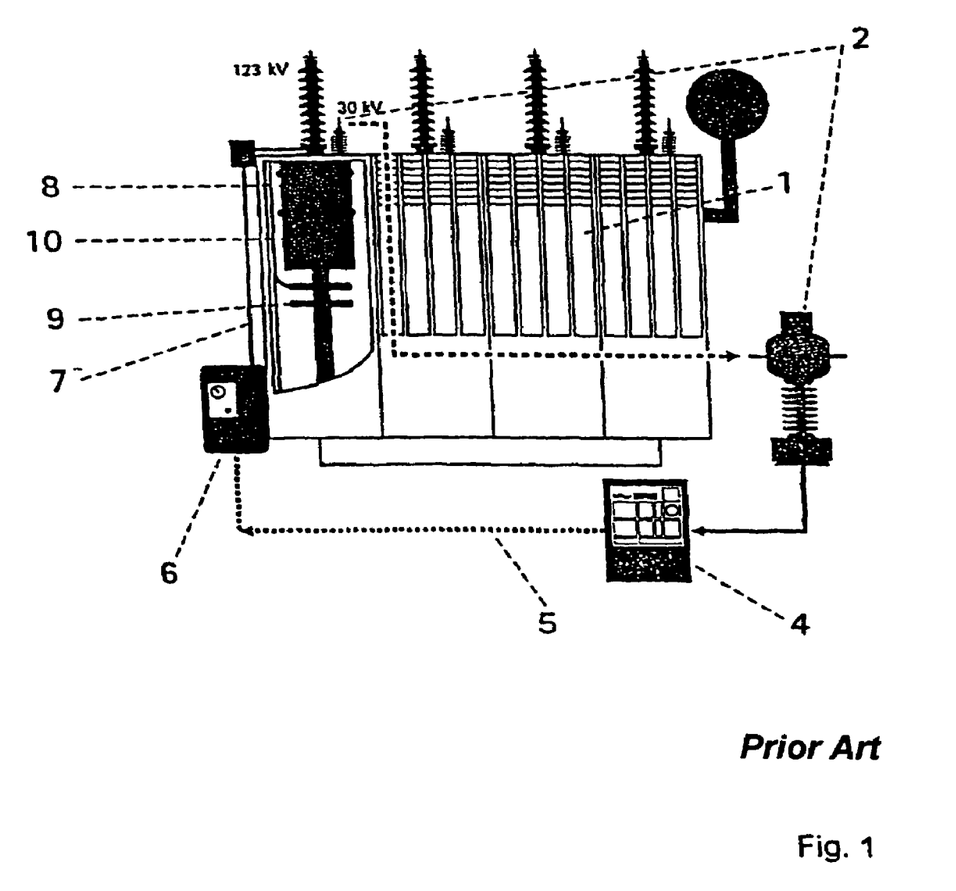
FIG. 1 shows an arrangement according to the state of the art.

Initially the previous state of the art shall be briefly explained again by reference to FIG. 1. There is illustrated a transformer 1 on which is mounted a conventional voltage transducer 2 that converts the actual voltage—as a example, 30 kv—into a measurement signal of, here, 100 V. This voltage transducer 2 is electrically connected through a measurement line 3 with a voltage regulator 4 that is located in a control room. Control lines 5 lead from this voltage regulator 4 to the motor drive 6. The motor drive 6 in turn is connected in known manner by way of a drive shaft 7 with a tap changer 8. The tap changer 8 shown here has a selector 9 for power-free preselection of the winding taps of the transformer's control winding and beyond that comprises a load changeover switch 10 for the actual interrupted switchover; other forms of construction of tap changers are equally well conceivable. By way of the control lines 5 the setting commands generated in the voltage regulator 4 as a result of the comparison of the actual voltage and the target voltage are on the one hand communicated to the motor drive 6, and on the other hand the voltage regulator 4 receives in turn data from the motor drive 6, for example with respect to the actual setting of the tap changer and the switching sequences respectively taking place in the case of the individual switchovers.

Figure 2:
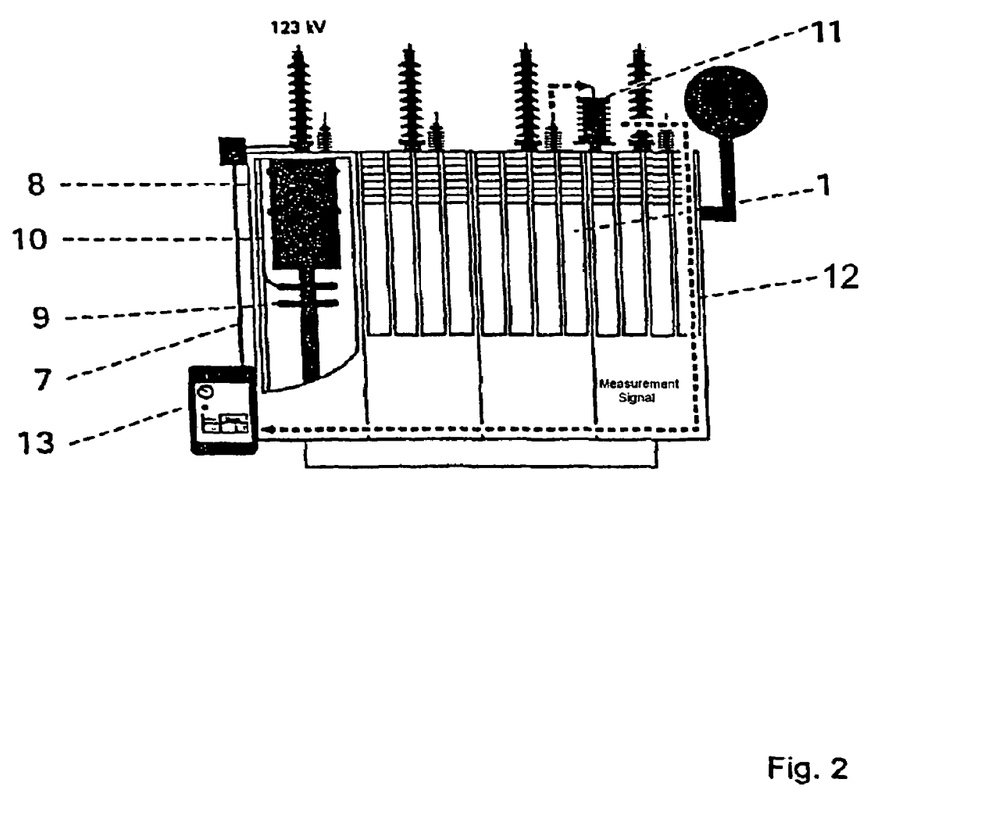
FIG. 2 shows an arrangement according to the invention for voltage regulation for mains influencing.

FIG. 2 shows an arrangement according to the invention. In that case a non-conventional voltage transducer 11 is arranged at the transformer 1 and converts the actual voltage—here, again, as an example 30 kV—into a measurement signal, in this case 1.87 V. A measurement line 12, which like the substantially smaller measurement signal can also be dimensioned to be smaller, leads to the electronic motor drive 13. The electronic motor drive 13 is additionally equipped with means for comparison of target value and actual value and for performance of regulator functions and generation of control signals. The drive shaft 7 again leads directly from the motor drive 13 to the tap changer 8 and actuates it. It can thus be seen that the electronic motor drive 13 combines the functions of the subassemblies of voltage regulator 4 and motor drive 6 separately illustrated in FIG. 1.

The non-conventional voltage transducer 11 for producing the actual value of the voltage was mentioned in a particularly advantageous embodiment of the invention. Such non-conventional transducers have been increasingly developed in the last years and are known to the expert in numerous forms. An early comprehensive illustration of non-conventional transducers or measurement converters can already be found in the thesis "Ein Beitrag zur Beurteilung der Möglichkeiten des Einsatzes nichtkonventioneller Messwandler and der Grenzen für eine Verdrängung klassischer Messtransformatoren" of Dr. Ermisch, Dresden, 1984. General requirements of electronic voltage transducers of non-conventional kind are evident from IEC 38 (Sec) 122: 1993 or VDE 0414. Such non-conventional transducers are typically available in the most diverse forms; reference may be made here to, for example, optical transducers, i.e. fibre-optical or also bulk-optical transducers that for their part operate in accordance with polarimetric (Faraday effect) or also interferometric principles. In addition, passive non-conventional voltage transducers are known from the company publications "Low Power Voltage Transducer for Medium Voltage GIS Systems Type LPVTG" and ". . . Type LoPoVt" of the company Trench, Switzerland. The Type LPVTG is a resistive voltage divider which replaces classic, i.e. conventional inductive or capacitive, measurement transducers.

An overview with respect to resistive voltage dividers by comparison with conventional voltage transducers is given by the periodical etz, Vol. 15-16/1997, page 20 et seq.

The non-conventional voltage transducer 11 produces a measurement signal in a voltage region that is transmitted approximately without loss of power and supplied to the electronic motor drive 13; this signal can be further processed directly there. For that purpose the electronic motor drive 13 has means for analog-to-digital conversion of the voltage transducer signal and in addition has at least one resolver for detecting the position of the drive shaft 7 as well as an electronic controller. The electronic controller takes over the functions of the earlier separate voltage regulator; it carries out a comparison of target value and actual value and produces, taking into consideration previously established control parameters, such as, for example, switching delay, control threshold and others, in a given case a control signal that serves directly for actuation of the drive shaft 7 and thus of the tap changer 8 by means of an electric motor.

Figure 3:
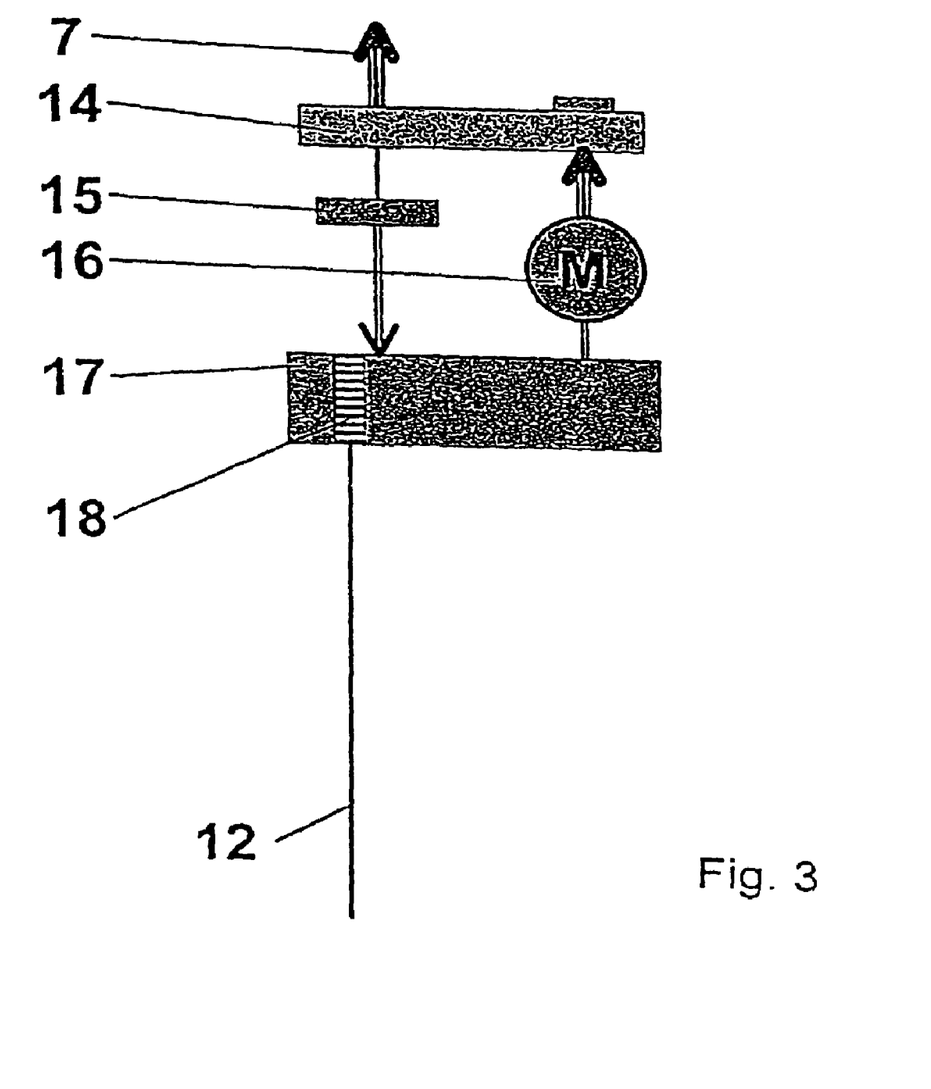
FIG. 3 shows a first motor drive according to the invention.

A first embodiment of an electronic motor drive according to the invention will be explained in detail in the following by reference to FIG. 3. The motor drive comprises, in per se known manner, a transmission 14 for actuation of the drive shaft 7 of the tap changer. The transmission 14 in this case reduces the rotational movement produced by an electric motor 16, as a rule a three-phase synchronous motor. A position-reporting device 15 for detecting the position of the selector of the tap changer is connected with the transmission 14. The central part of the motor drive according to the invention is an electronic controller subassembly 17 that has means for comparing the measurement signal that comes from the voltage transducer with a predetermined target value and for issuing, in the case of a deviation exceeding a presettable threshold, a control command and controlling the electric motor 16 in dependence on rotational direction in order to thereby actuate in direct succession the tap changer by way of the drive shaft 7 thereof. The electronic controller subassembly 17 is in turn connected by way of an interface subassembly 18 with the single measurement line 12 that was already explicitly described further above and that carries data from the non-conventional voltage transducer.

The control subassembly 17 basically consists of a memory-programmable controller, a microcontroller or also an industrial computer. Which of these possibilities is selected depends on a number of factors, such as space requirement, costs, operating speed; an appropriate selection is the province of an expert.

The interface subassembly 18 comprises an analog-to-digital converter and further means for generating a measurement signal that is compatible with the control subassembly from the measurement signal transmitted in the measurement line 12. It thus represents a digital interface for the downstream control subassembly 17 and can be executed as, for example, a field bus or as a known RS 485 interface.

Figure 4:
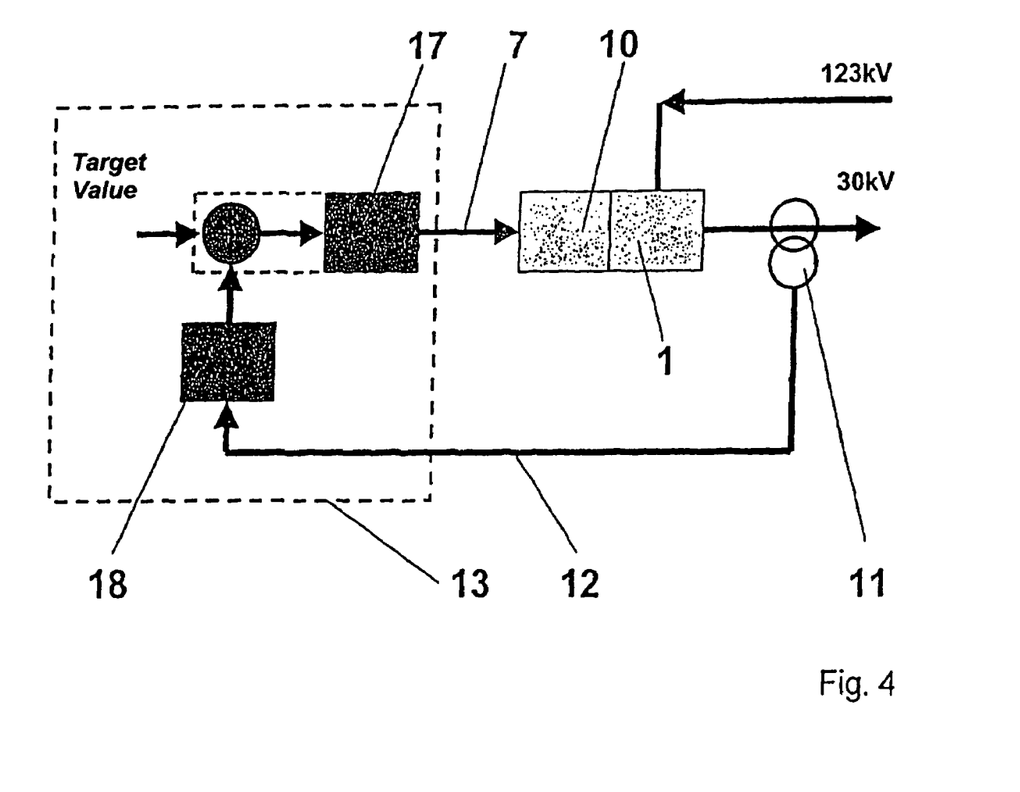
FIG. 4 shows a control circuit for voltage regulation in an arrangement with the motor drive illustrated in FIG. 3.

A corresponding control circuit with such a motor drive is separately illustrated again in FIG. 4. From the non-conventional voltage transducer 11 the measurement signal is transmitted, as a measure for the actual value at the transformer 1, by way of the measurement line 12 to the interface subassembly 18 of the motor drive 13 that is indicated by a dashed line. The control subassembly 17, in which a target value and actual value comparison is carried out, i.e. a comparison of the actual value communicated by the non-conventional voltage transducer 11 with the previously stored target value, is arranged downstream of the interface subassembly 18. If this comparison reports a deviation having a value which exceeds a previously settable control threshold, then a control command is produced, whereby the electric motor 16 is actuated, which in turn in sequence actuates the drive shaft 7. Thus the load changeover switch 10 of the tap changer is actuated and the secondary voltage of the transformer 1 changes. The control circuit is closed by a new measurement by way of the non-conventional voltage transducer 11 and feedback to the subassembly 17.

It is also possible within the scope of the invention to provide, instead of the non-conventional voltage transducer 11, another measurement transducer or also to extract data with respect to the actual value of the voltage at a bus system.

Figure 5:
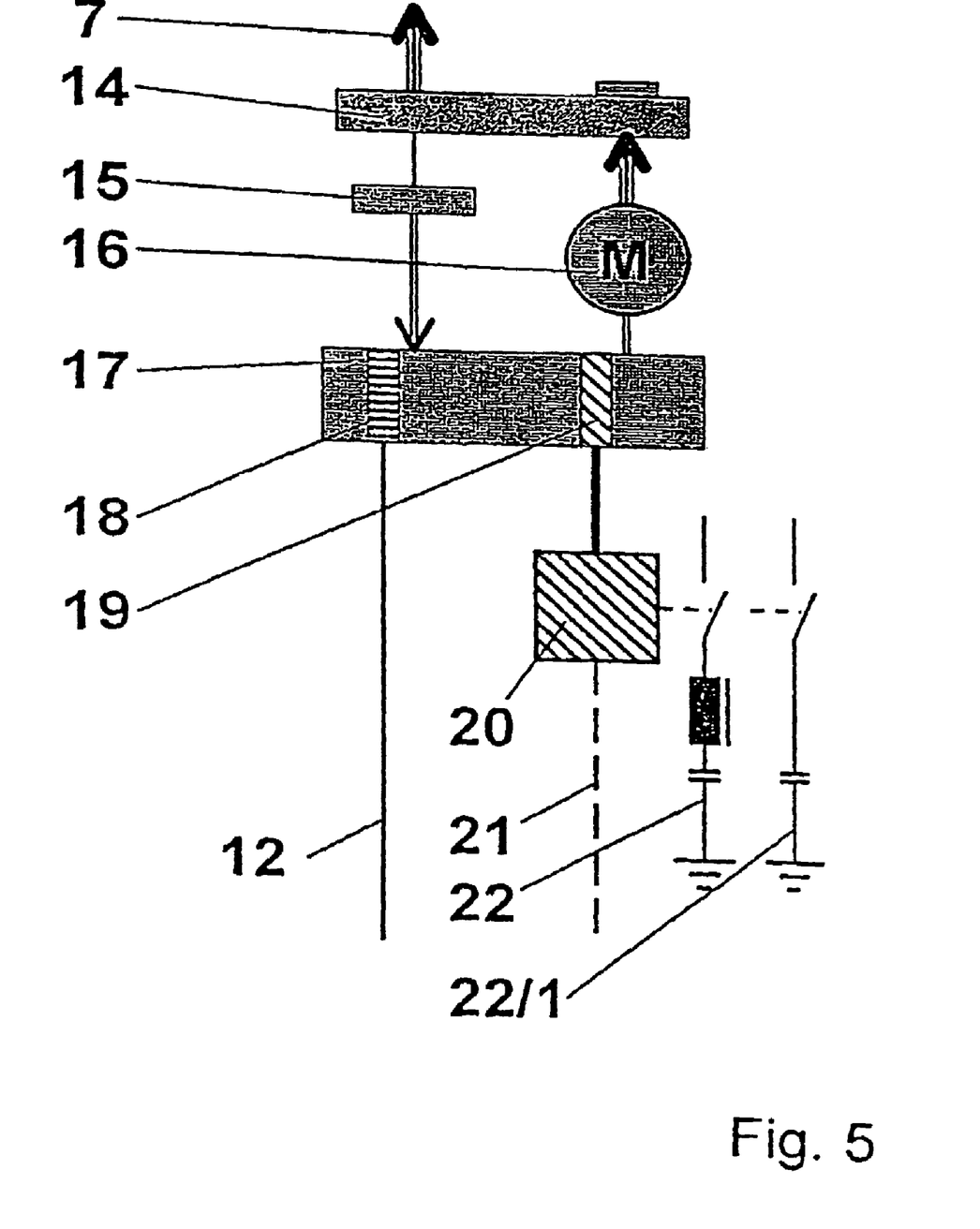
FIG. 5 shows a second motor drive according to the invention with further means for mains influencing.

A second embodiment of a motor drive according to the invention is illustrated in FIG. 5. In that case an analysis of the voltage quality of the corresponding voltage that is to be regulated is provided as an additional possibility of mains influencing. The output voltage of the non-conventional voltage transducer 11 is then additionally fed by way of a further measurement line 21 to a reactive power compensator 20. It is obviously also possible to tap off the measurement signal from the measurement line 12 that is present in any case. Such a reactive power compensator 20 is available as, for example, the apparatus "POCOS Control", which is made by the applicant, in commercial form. The output thereof leads by way of a further interface subassembly 19 back to the electronic controller subassembly 17. However, it is possible to construct the reactive power compensator 20 itself as an integral component of the control subassembly 17. In conjunction with a direct voltage regulation, an impermissable voltage excess due to a possble overcompensation of the voltage mains to be regulated can thus, in addition, be directly counteracted. Such a voltage excess, which is known from the literature as the Ferranti effect, results at the end of, for example, and idling operating line from the complex ratio of the voltages at the beginning and end of these lines, this relationship here representing a real magnitude. Input voltage and output voltage in this case are characterized by the same phase position, so that the capacitive charging current of the line inductance produces a voltage amount that adds to the input voltage in such a manner that the output voltage is thus greater that the input voltage of this line. On the basis of different preset target values, such as, for example, the displacement factor cos $\phi$ or the permissible harmonic content of the measured voltage, the switching-on or switching-off of the capacitor 22/1 or the absorption circuit 22 is taken care of by the reactive power compensator 20. A voltage regulation and thus mains influencing is similarly possible by such a compensation installation, i.e. capacitor installation, switchable in stages. In the case the capacitive reactive current of the compensation installation causes a voltage rise at the predominantly inductive impedance of the feed path of the mains when the provided capacitive reactive power is not exclusively required for compensation for inductive reactive power of consumers in the mains. This control method is particularly feasible when the long voltage decay caused by a strongly variable inductive reactive power requirement is to be kept substantially constant. Such a specifically constructed compensation system is described in WO 1994/024622.

It is also possible to use not only tap chargers, but also reactive power compensation systems in parallel for the mains influencing. Both categories of apparatus can in that case be simultaneously activated by the previously described motor drive according to the invention for automatic mains influencing, The usually employed reactive power regulators in that case serve for coarse regulation; they have control time constants of 10 to 30 minutes, so that they do not collide with the control algorithms of the faster operating tap charger.

The electronic controller subassembly 17 can in addition also have further subassemblies for conducting monitoring functions or, for example, for controlling fans at the transformer 1.

Figure 6:
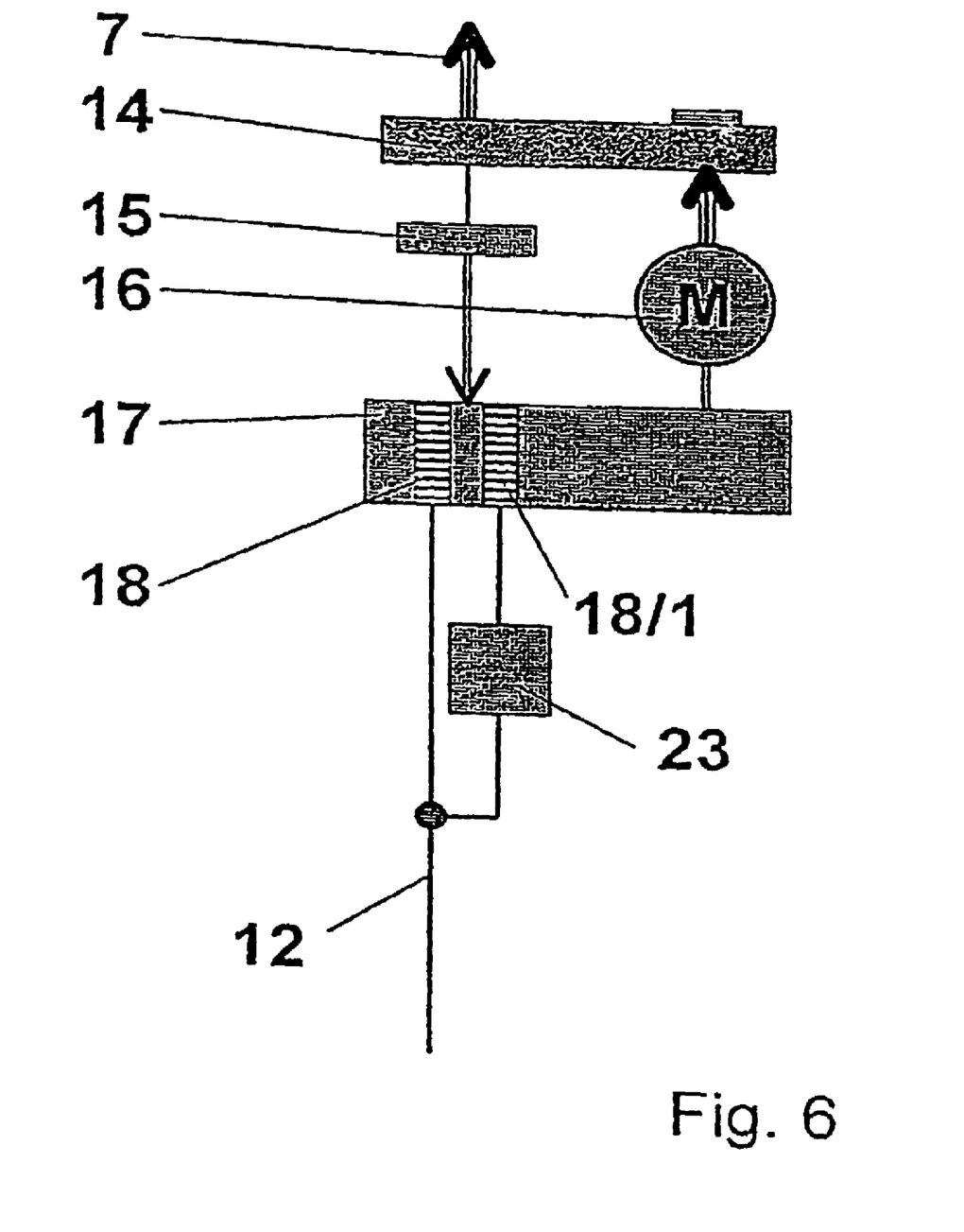
FIG. 6 shows a third motor drive according to the invention with additional means for mains influencing and FIG. 7 shows a control circuit of a voltage regulation in an arrangement with the motor drive illustrated in FIG. 6.
Figure 7:
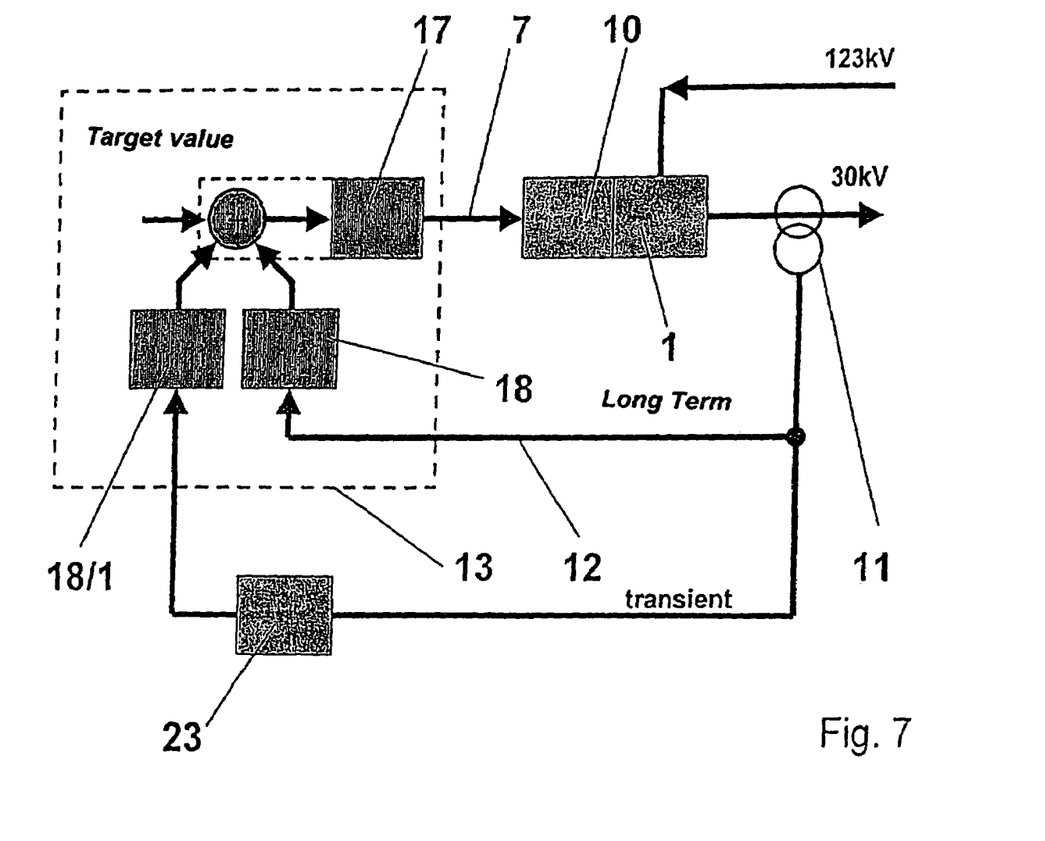

A particularly advantageous further embodiment of the invention is illustrated in FIGS. 6 and 7. In that case the control subassembly 17 comprises, in addition to the already described interface subassembly 18, a further interface subassembly 18/1 that is provided along with a further measuring arrangement 23 operating at high speed. Such a fast measuring arrangement 23 is produced, similarly by the applicant, under the designation "Voltage Dip Meter." The subassembly 17 is thus placed in the position of also recognizing and processing transient voltage incursions of short duration in order to optionally influence the level, which is delivered by the transformer, of the regulated voltage. Such a fast voltage regulation for rapid mains influencing can take place, for example, with fast-acting control power-electronic mains elements, so-called FACTS elements that are known per se. FACTS enable selective influencing of non-reactive and reactive power influences and rapid activation of non-reactive and reactive power influencing with high control dynamics. Fast all-thyristor tap changers for rapid control out voltage incursions are equally suitable. Such tap changers are known from, for example, WO 1995/027931 U.S. equivalent U.S. Pat. No. 5,604,442 or WO 1997/005536 (U.S. equivalent U.S. Pat. No. 5,969,511). The control of the described fast-acting control components is possible in simple manner by means of the arrangement according to the invention for mains influencing.

According to a further embodiment of the invention it is possible that the electronic controller subassembly 17 also serves for actuation of a ground leakage coil. This principle of ground leakage quenching or regulation by means of an ground leakage coil is known to the expert. It is based on the fact that compensation can be provided at a fault location for the capacitive component of the fault current by the inductive current of the ground leakage coil. In that case with ideal compensation only a very small resistive residual current flows. Distinction is to be made between two methods for the regulation: on the one hand, regulation with negligible mains reaction in the case of greater displacement voltages and on the other hand regulation in the case of not inappreciable mains reaction, i.e. changes in the mains which have an effect on the displacement voltage. The regulation itself takes place in a manner known per se by adjustment of the inductance of the ground leakage coil.

The invention claimed is:

1. An arrangement for automatic mains influencing comprising:
   a tap changer,
   a tapped transformer having a control winding provided with different winding taps connectable without interruption by the tap changer,
   a motor drive mechanically coupled with the tap changer,
   a measurement transducer for detection of an actual value of a voltage to be regulated and mounted on the tapped transformer,
   means mounted on the motor drive for comparison of the actual value measured by the transducer with a previously established target value and for generating, in dependence on the comparison, a setting command for actuation of the motor drive and thus of the tap changer in dependence on motor rotational direction, and
   a single electrical measurement line leads directly from the measurement transducer to the motor drive.

2. The arrangement according to claim 1 wherein the measurement transducer is a noninductive and noncapacitative voltage transducer.

3. In combination with a tapped transformer and a tap changer, a motor drive for automatic mains influencing, the drive comprising:
   a common housing,
   an electric motor provided in the common housing and having a drive shaft connected to the tap changer for uninterrupted switching over between different winding taps of the tapped transformer,
   a control subassembly provided in the common housing,
   an interface subassembly in the common housing,
   a measurement transducer mounted outside the housing on the transformer,
   a measurement line connecting the interface assembly in the housing with the measurement transducer outside the housing, and
   means in the common housing and forming part of the control assembly for comparing a measurement signal generated by the measurement transducer and received through the measurement line with a previously stored target value and for generating a control signal in dependence on the comparison, the electric motor being directly actuable by the control subassembly in dependence on rotational direction.

4. The motor drive according to claim 3 wherein the measurement transducer is a noninductive and noncapacitative voltage transducer.

5. In combination with a tapped transformer and a tap changer, a motor drive for automatic mains influencing, the drive comprising:
   a common housing,
   an electric motor provided in the common housing and having a drive shaft connected to the tap changer for uninterrupted switching over between different winding taps of the tapped transformer,
   a control subassembly provided in the common housing,
   an interface subassembly in the common housing,
   a measurement transducer mounted outside the housing on the transformer,
   a measurement line connecting the interface assembly in the housing with the measurement transducer outside the housing,
   means in the common housing and forming part of the control assembly for comparing a measurement signal generated by the measurement transducer and received through the measurement line with a previously stored target value and for generating a control signal in dependence on the comparison, the electric motor being directly actuable by the control subassembly in dependence on rotational direction; and
   a reactive power compensator in the common housing and having
      an input connected with the measurement transducer mounted outside the housing,
      a further interface subassembly, and
      an output also connected with the control subassembly by way of the further interface subassembly.

6. The motor drive according to claim 3, further comprising a fast-acting measuring arrangement for detection of transient voltage incursions and having an output connected with the control subassembly by a further interface subassembly.

7. The motor drive according to claim 3, further comprising additional means for rapid mains influencing, having rapid semiconductor tap changers and actuable by the control subassembly.

8. The motor drive according to claim 3, further comprising additional means for actuation including a ground leakage coil.

* * * * *

UNITED STATES PATENT AND TRADEMARK OFFICE
CERTIFICATE OF CORRECTION

PATENT NO. : 7,449,851 B2
APPLICATION NO. : 10/451806
DATED : November 11, 2008
INVENTOR(S) : Dieter Dohnal et al.

Page 1 of 1

It is certified that error appears in the above-identified patent and that said Letters Patent is hereby corrected as shown below:

Title Page; item (75);
Please add the third inventor:

-- Karsten Viereck, Diesenbach (DE) --

Signed and Sealed this

Tenth Day of February, 2009

JOHN DOLL
*Acting Director of the United States Patent and Trademark Office*